United States Patent
Zhou et al.

(10) Patent No.: US 11,705,947 B2
(45) Date of Patent: Jul. 18, 2023

(54) TECHNIQUES FOR ACTIVATING OR DEACTIVATING ANTENNA PANELS AT A USER EQUIPMENT

(71) Applicant: QUALCOMM Incorporated, San Diego, CA (US)

(72) Inventors: Yan Zhou, San Diego, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/498,549

(22) Filed: Oct. 11, 2021

(65) Prior Publication Data

US 2022/0116084 A1 Apr. 14, 2022

Related U.S. Application Data

(60) Provisional application No. 63/090,570, filed on Oct. 12, 2020.

(51) Int. Cl.
*H04L 5/12* (2006.01)
*H04B 7/06* (2006.01)
*H04B 7/08* (2006.01)

(52) U.S. Cl.
CPC ......... *H04B 7/0608* (2013.01); *H04B 7/0802* (2013.01)

(58) Field of Classification Search
CPC .............................. H04B 7/0608; H04B 7/0802

USPC ........ 375/262, 261, 260, 259, 219, 295, 316
See application file for complete search history.

(56) References Cited

U.S. PATENT DOCUMENTS

| 2020/0169995 | A1 | 5/2020 | Nam et al. |
| 2020/0267712 | A1 | 8/2020 | Cirik et al. |
| 2021/0168714 | A1* | 6/2021 | Guan .................. H04W 52/242 |
| 2022/0231732 | A1* | 7/2022 | Guo ...................... H04B 7/0602 |

FOREIGN PATENT DOCUMENTS

| CN | 110521265 A | 11/2019 |
| CN | 110537334 A | 12/2019 |
| WO | 2020215335 A1 | 10/2020 |
| WO | 2020220230 A1 | 11/2020 |

OTHER PUBLICATIONS

International Search Report and Written Opinion—PCT/US2021/054589—ISA/EPO—dated Feb. 11, 2022.

* cited by examiner

*Primary Examiner* — Zewdu A Kassa
(74) *Attorney, Agent, or Firm* — Arent Fox, LLP/Qualcomm

(57) ABSTRACT

Aspects described herein relate to activating, by a user equipment (UE), or causing activation of, by a base station, one or more antenna panels at the UE. An action time for activating or deactivating the one or more antenna panels may also be used to allow processing time related to activation or deactivation of the antenna panels.

31 Claims, 10 Drawing Sheets

TECHNIQUES FOR ACTIVATING OR DEACTIVATING ANTENNA PANELS AT A USER EQUIPMENT

CLAIM OF PRIORITY UNDER 35 U.S.C. § 119

The present Application for Patent claims priority to Provisional Patent Application No. 63/090,570, entitled "TECHNIQUES FOR ACTIVATING OR DEACTIVATING ANTENNA PANELS AT A USER EQUIPMENT" filed Oct. 12, 2020, which is assigned to the assignee hereof and hereby expressly incorporated by reference herein for all purposes.

TECHNICAL FIELD

The present disclosure relates generally to wireless communication systems, and more particularly, to techniques for activating or deactivating one or more antenna panels.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support UEs having multiple antenna panels, where the UE may use one or more of the multiple antenna panels to receive communications from one or more base stations at a given point in time.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of the disclosure, a method, a computer-readable medium, and an apparatus are provided. In some aspects, the method includes determining, by a user equipment (UE), to activate or deactivate at least one of a plurality of antenna panels at the UE, transmitting, to a base station, an indication of activating or deactivating the at least one of the plurality of antenna panels, and activating or deactivating, based on transmitting the indication, the at least one of the plurality of antenna panels.

In another aspect, a method includes determining, by a UE, to activate or deactivate at least one of a plurality of antenna panels at the UE for communicating with a base station, determining, by the UE, an action time for activating or deactivating the at least one of the plurality of antenna panels at the UE, and activating or deactivating, based on the action time, the at least one of the plurality of antenna panels.

In another aspect, a method includes determining, by a base station, to activate or deactivate at least one of a plurality of antenna panels at a UE, wherein the determining is based on at least one of determining a number of activated antenna panels of the plurality of antenna panels, determining none of the at least one of the plurality of antenna panels are determined to be deactivated, or determining none of the at least one of the plurality of antenna panels are determined to be activated. The method further includes transmitting, to the UE, an indication to activate or deactivate the at least one of the plurality of antenna panels.

In another aspect, a method includes determining, by a base station, to activate or deactivate at least one of a plurality of antenna panels at a UE, determining, by the base station, an action time for activating or deactivating the at least one of the plurality of antenna panels at the UE, and communicating, based on the action time, with the UE having activated or deactivated the at least one of the plurality of antenna panels.

In another aspect, a method includes transmitting, to a base station, an indication that the UE is to activate or deactivate at least one of a plurality of antenna panels, and activating or deactivating the at least one of the plurality of antenna panels according to an action time at which the UE is to activate or deactivate the at least one of the plurality of antenna panels.

In another aspect, a method includes receiving, from a user equipment (UE), an indication that the UE is to activate or deactivate at least one of a plurality of antenna panels at the UE, and communicating, based on an action time at which the UE is to activate or deactivate the at least one of the plurality of antenna panels, with the UE having activated or deactivated the at least one of the plurality of antenna panels To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Like reference numbers and designations in the various drawings indicate like elements.

DETAILED DESCRIPTION

Figure 1:
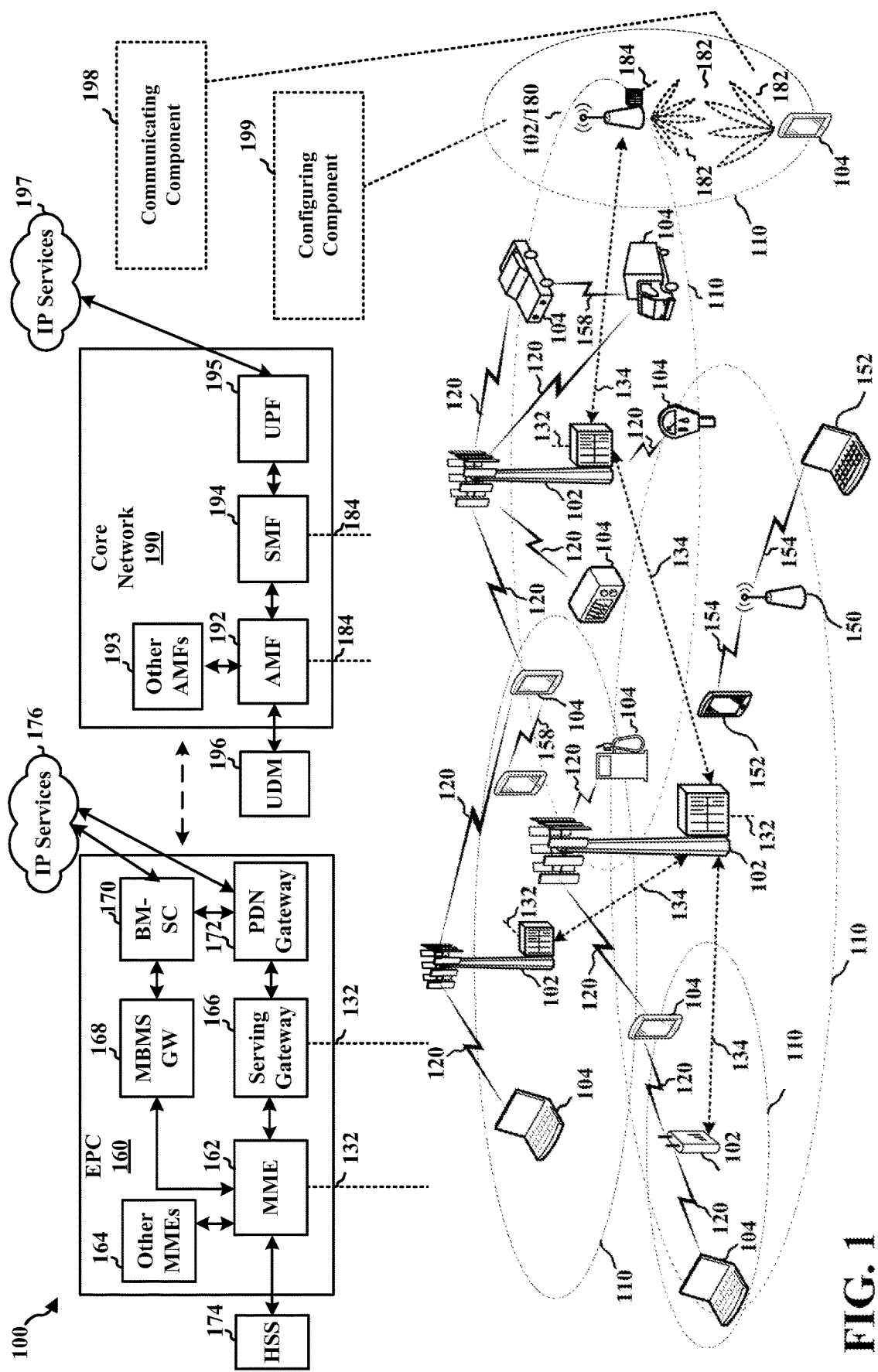
FIG. 1 is a diagram illustrating an example of a wireless communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

A UE may be equipped with multiple panels or arrays of antennas positioned at different positions in or on the UE, or facing different directions, for improved communication diversity. The UE may define one or more virtual antenna panels that are based on (or that include) one or multiple (or portions of) the panels or arrays on the UE. In other words, each virtual antenna panel may include (or may map to) one or more, or a portion of one or more, physical antenna panels. In some examples, all antennas in an antenna panel may share the same timing advance (TA) or power control (PC). In the following description, a physical antenna panel and a virtual antenna panel may both be referred to generally as an "antenna panel." As such, a reference to an antenna panel may refer to a physical antenna panel or a virtual antenna panel. Each antenna panel, whether physical or virtual, may be associated with a respective antenna panel identifier.

Various aspects relate generally to techniques for activating or deactivating antenna panels at a user equipment (UE). In some examples, a UE with multiple antenna panels may determine which antenna panel(s) are to be activated or deactivated for communicating with a base station. In some examples, the UE or the base station may make the decision on which antenna panel(s) to activate or deactivate at the UE. In addition, once the decision on which antenna panel(s) to activate or deactivate is made, the UE or base station may determine an action time by or at which the antenna panel(s) are to be activated or deactivated at the UE.

In some examples, the UE (or base station) may determine which of the UE or base station is to indicate activation or deactivation of the antenna panel(s) on the UE. The UE (or base station) may make the determination based on various additional considerations, such as a number of antenna panels to be activated or deactivated, a number of resulting activated panels following activation or deactivation, an original or new panel status (for example, active or inactive), or the like. Additionally, in some examples, the UE (or the base station) may base the action time for effectuating the activation or deactivation of antenna panel(s) at the UE on various considerations, which may include whether the activation or deactivation is indicated by the UE or the base station. Additionally or alternatively, in some examples, the UE (or the base station) may determine the action time based on a start reference time, which may also be based on additional considerations described herein.

Particular implementations of the subject matter described in this disclosure may be implemented to realize one or more of the following potential advantages. In some aspects of the present disclosure, the described apparatus and methods that allow the UE to determine which antenna panel(s) to activate or deactivate may provide additional control at the UE without requiring signaling from the base station to handle activation or deactivation. In addition, in some aspects, the described apparatus and methods that allow the base station to determine which antenna panels to activate or deactivate at the UE may provide additional control at the base station. The control at the base station may be desirable in some cases, as the base station may detect certain environmental conditions, such as maximum permissible exposure (MPE) at the UE, and the base station may accordingly modify the panel configuration. Additionally, in some aspects, the described apparatus and methods that determine an action time for activating or deactivating antenna panels at the UE may ensure that the UE has sufficient time to activate a panel or may ensure that the base station has sufficient time to map beam indications of antenna panels to be deactivated to other activated antenna panels, or the like.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

FIG. 1 is a diagram illustrating an example of a wireless communications system 100. The wireless communications system 100 (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (for example, 3 GHz-300 GHz) has extremely high path loss and a short range. The mmW base station 180 may utilize beamforming to generate beamformed signals 182 (also referred to as "beams") with the UE 104 to compensate for the extremely high path loss and short range. The base station 180 and the UE 104 may each include a plurality of antennas, such as antenna elements, antenna panels, or antenna arrays to facilitate the beamforming. Though base station 102 and mmW base station 180 are separately shown, aspects described herein with respect to a base station 102 may relate to, and be implemented by, a mmW base station 180.

The base station 180 may transmit a beamformed signal to the UE 104 in one or more transmit directions. The UE 104 may receive the beamformed signal from the base station 180 in one or more receive directions. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include a communicating component 198 configured to activate or deactivate antennal panels at the UE 104 or determine an action time for activating or deactivating the antenna panels. In some aspects, the base station 102 may include a configuring component 199 configured to request activation or deactivation of antenna panels at the UE 104 or determine the action time for the UE to activate or deactivate the antenna panels. Although the following description may be described in terms of 5G NR and related features, the concepts described herein may be applicable to other areas or wireless communication technologies, such as LTE, LTE-A, CDMA, global system for mobile communication (GSM), or future communications standards or technologies.

Figure 2:
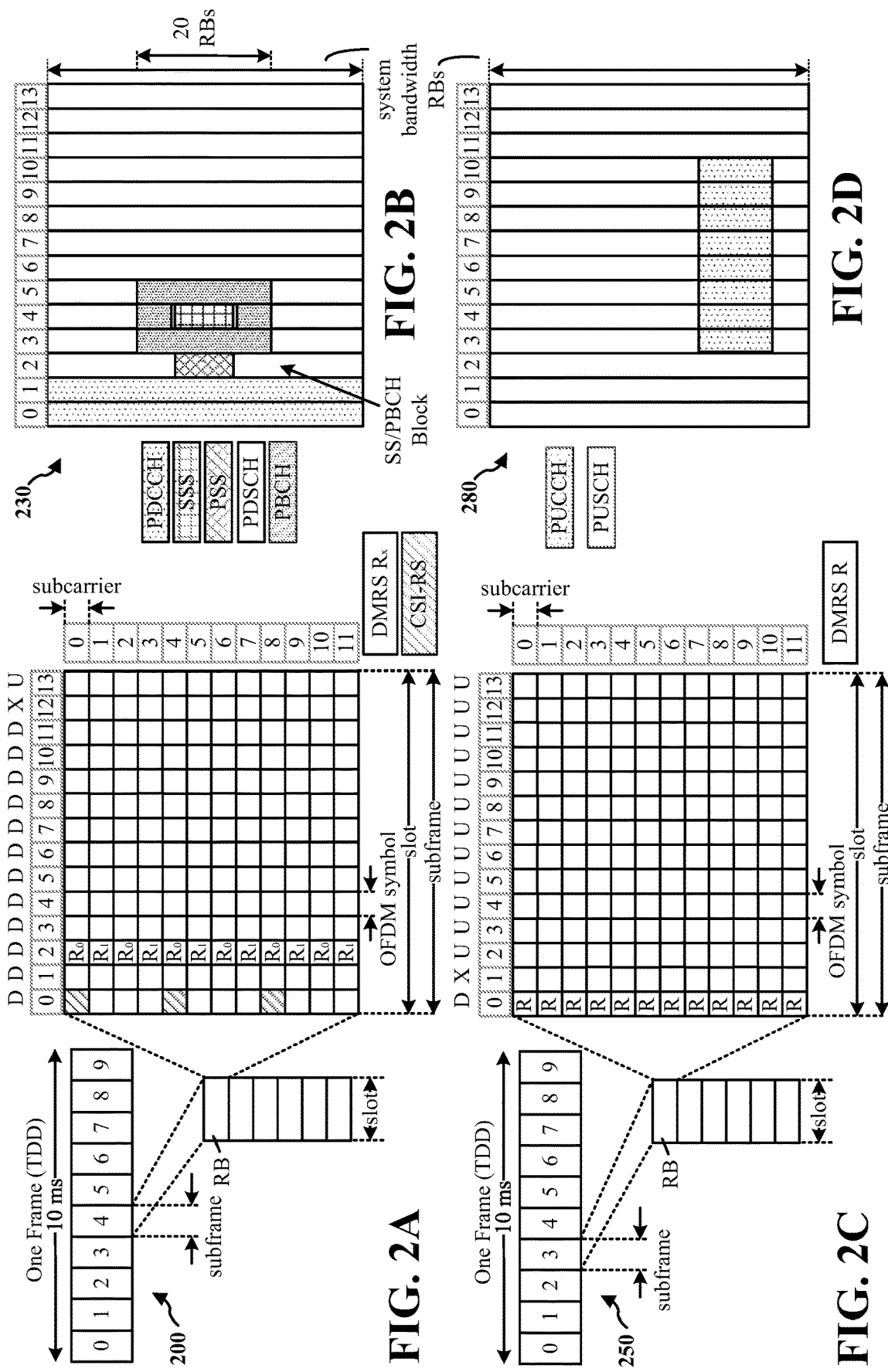
FIGS. 2A, 2B, 2C, and 2D are diagrams illustrating examples of a first fifth generation (5G)/new radio (NR) frame including an expanded view of a subframe, downlink (DL) channels within a 5G/NR subframe, a second 5G/NR frame including an expanded view of a subframe, and uplink (UL) channels within a 5G/NR subframe, respectively.

FIG. 2A is a diagram 200 illustrating an example of a first subframe within a 5G/NR frame structure, including an expanded view of a subframe. FIG. 2B is a diagram 230 illustrating an example of DL channels within a 5G/NR subframe. FIG. 2C is a diagram 250 illustrating an example of a second subframe within a 5G/NR frame structure, including an expanded view of a subframe. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE may determine a physical cell identifier (PCI). Based on the PCI, the UE may determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat/request (HARD) acknowledgement (ACK)/negative-ACK (NACK) feedback. The PUSCH carries data, and may additionally be used to carry a buffer status report (BSR), a power headroom report (PHR), or UCI.

Figure 3:
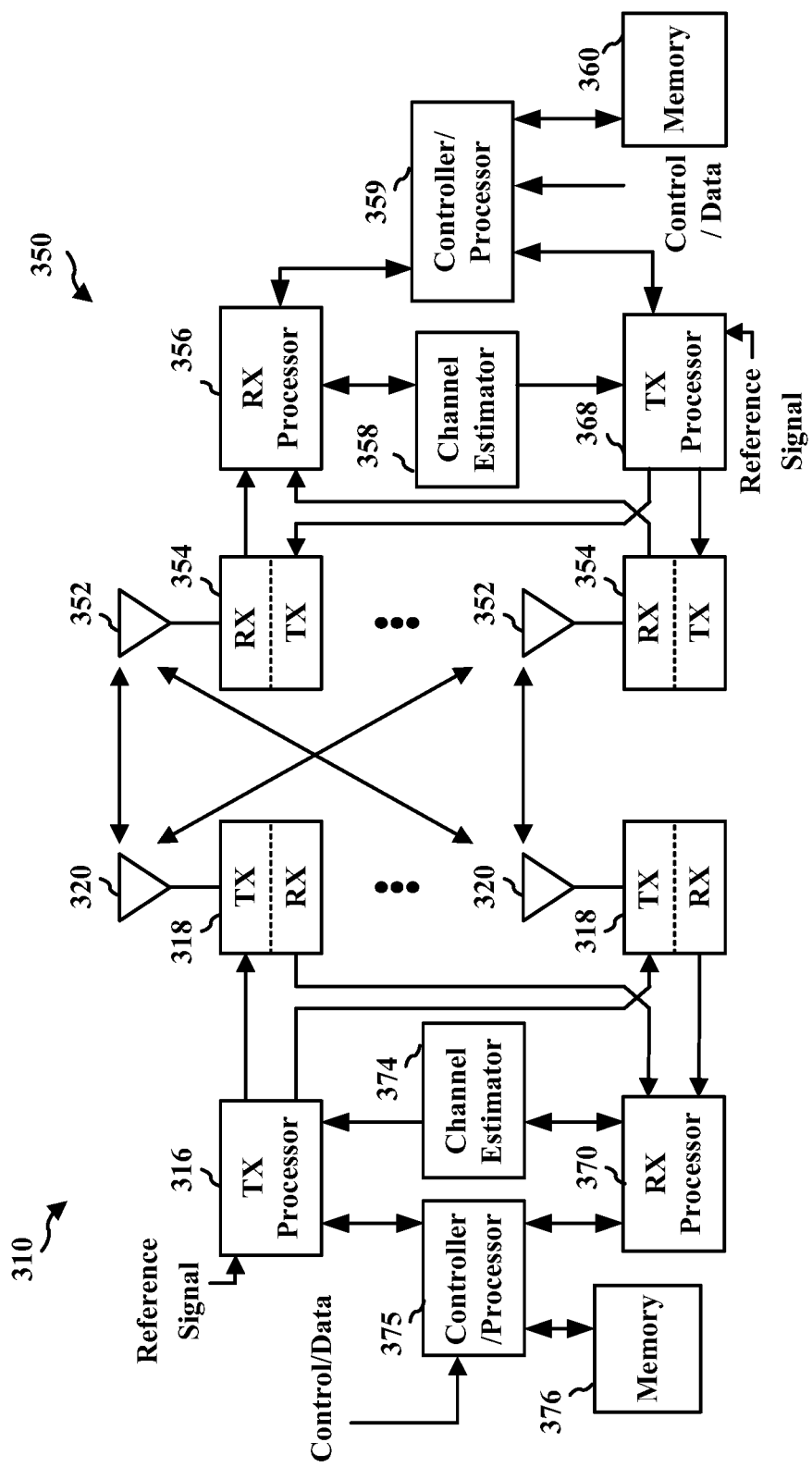
FIG. 3 is a diagram illustrating an example of a base station and an example of a user equipment (UE).

FIG. 3 is a block diagram of an example of a base station 310 in communication with an example of a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat/request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 may be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 may be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with communicating component 198 of FIG. 1.

At least one of the TX processor 316, the RX processor 370, and the controller/processor 375 may be configured to perform aspects in connection with configuring component 199 of FIG. 1.

Figure 4:
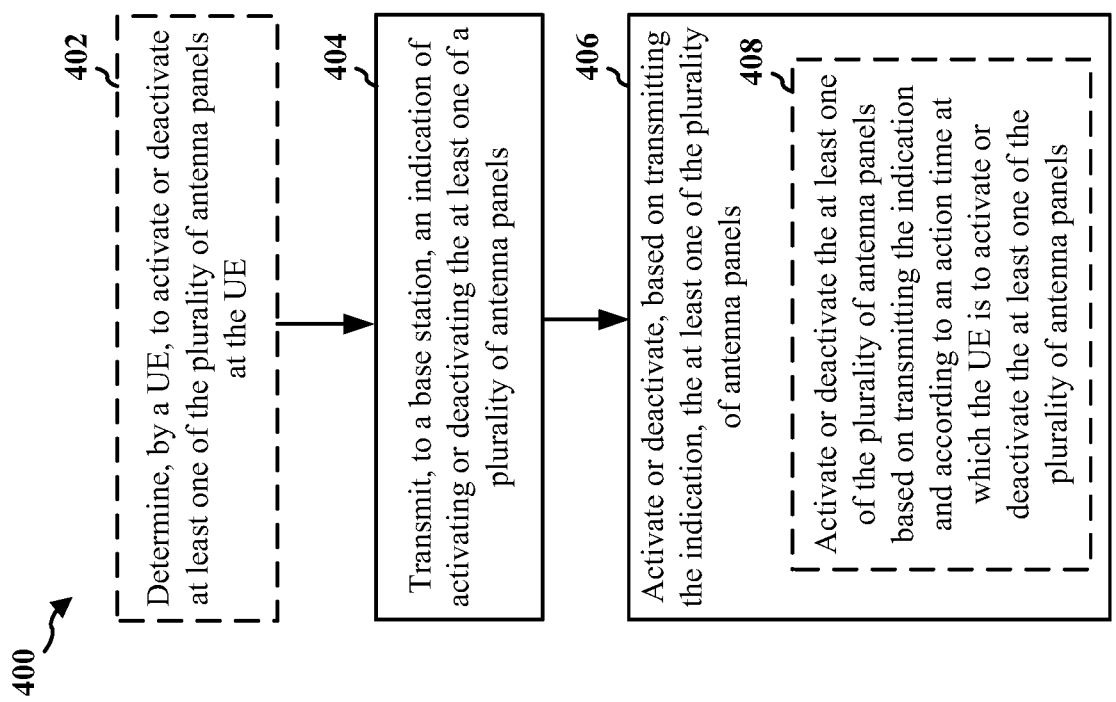
FIG. 4 is a flowchart illustrating an example of a method for activating or deactivating antenna panels in accordance with some aspects of the present disclosure.

FIG. 4 is a flowchart illustrating an example of a method 400 for activating or deactivating antenna panels in accordance with some aspects of the present disclosure. The method 400 may be performed by a UE (such as the UE 104, the wireless communication device 800, or the wireless communication device 900). In some examples, the method 400 may be performed by a portion of a UE 104, wireless communication device 800, or wireless communication device 900, such as including the memory 360, the memory 808, the TX processor 368, the RX processor 356, the controller/processor 359, the processor 806, or other components described herein.

Optionally, in block 402, the UE may determine to activate or deactivate at least one of a plurality of antenna panels at the UE. In some implementations, panel managing component 912, for example, in conjunction with the communicating component 198 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 908, the transmission component 910, or other components described herein) may determine to activate or deactivate at least one of a plurality of antenna panels at the UE. For example, panel managing component 912 may determine to activate or deactivate the at least one antenna panel based on various considerations, such as determining to reduce resource consumption at the UE 104 (for example, as part of entering or exiting a power saving mode), detecting an environmental condition at an antenna panel (for example, detecting blockage at the antenna panel caused by a physical object), or the like In another example, panel managing component 912 may determine to activate or deactivate the at least one antenna panel based on a request or instruction received from the base station 102, which may indicate one or more antenna panels to activated or deactivate. For example, such a request or instruction may be received from the base station 102 in RRC signaling, MAC-control element (CE) or DCI in dynamically scheduled signaling, or the like In some examples, panel managing component 912 may determine to activate or deactivate the one or more antenna panels (for example, without receiving a request or instruction from the base station 102) based on detecting one or more parameters or conditions. For example, panel managing component 912 may determine to activate or deactivate, or may determine to rely on the base station 102 to activate or deactivate, the one or more antenna panels based on a total number of activated antenna panels following activation or deactivation (for example, with respect to a threshold or a difference between a current number of activated panels and a new number of activated panels after activation or deactivation), based on a panel status of one or more antenna panels, or the like In some examples, panel managing component 912 may determine to activate or deactivate the one or more antenna panels where the total number of activated antenna panels (for example, as a result of the activation or deactivation) increases, and may depend on the base station to instruct activation or deactivation where the total number of activated antenna panels remains or decreases. In a specific example, where the total number of activated panels becomes larger, panel managing component 912 may receive a panel status request from the base station 102, or an instruction or request to modify activation or deactivation of the one or more antenna panels, and panel managing component 912 may accordingly determine to reject, accept, or modify activation or deactivation indicated in the request. In another specific example, where the total number of activated panels becomes larger, panel managing component 912 may directly inform the base station 102 of the new panel status.

In another specific example, where the total number of activated panels remains or decreases, panel managing component 912 may receive, from the base station 102, an instruction or request to activate or deactivate antenna panels as long as total number of activated panels remains the same or is less (for example, via receiving the panel status command from the base station, which may indicate which panel should be in which status, or the like). In another specific example, where the total number of activated panels remains or decreases, panel managing component 912 may send a panel status request to the base station 102, or an instruction or request to modify activation or deactivation of the one or more antenna panels, which may be accepted, rejected, or modified by the base station 102.

Figure 5:
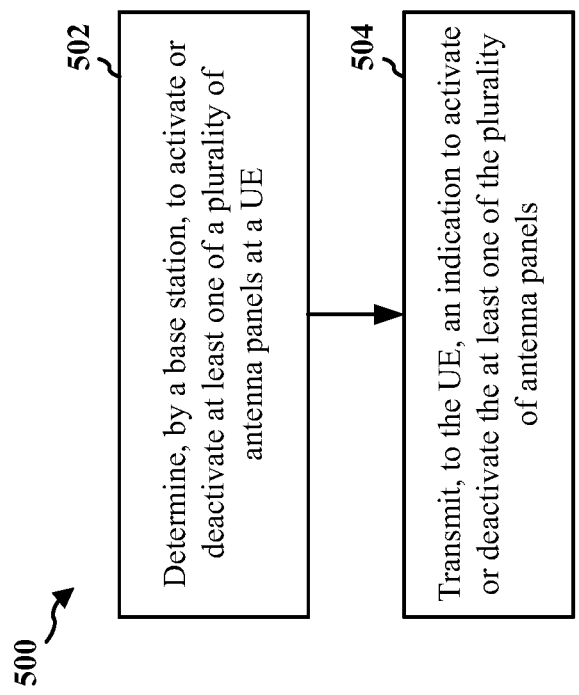
FIG. 5 is a flowchart illustrating an example of a method for determining to instruct a UE to activate or deactivate antenna panels in accordance with some aspects of the present disclosure.

In another example, panel managing component 912 may similarly determine to activate or deactivate the one or more antenna panels where the total number of activated antenna panels (for example, as a result of the activation or deactivation) remains or decreases, and may depend on the base station to instruct activation or deactivation where the total number of activated antenna panels increases, as described further herein in reference to block 502 of method 500 in FIG. 5.

In another example, panel managing component 912 may determine to activate one or more antenna panels based on determining that none of the panels are to be deactivated. In other words, for example, panel managing component 912 may determine to activate, but not deactivate, the one or more antenna panels, and may depend on the base station to instruct the UE 104 to deactivate antenna panels. In such examples, panel managing component 912 may activate antenna panels and may directly inform the base station 102 that at least one panel has been turned on. In addition, in such examples, where the base station sends a panel activation request, panel managing component 912 may reject, accept, or modify activation indicated in the request.

In another example, panel managing component 912 may determine to deactivate one or more antenna panels based on determining that none of the panels are to be activated. In other words, for example, panel managing component 912 may determine to deactivate, but not activate, the one or more antenna panels, and may depend on the base station to instruct the UE 104 to activate antenna panels. In such examples, panel managing component 912 may deactivate antenna panels and may directly inform the base station 102 that at least one panel has been turned off. In addition, in such examples, where the base station sends a panel deactivation request, panel managing component 912 may reject, accept, or modify deactivation indicated in the request.

In addition, in some examples, base station 102 may instruct the UE 104 to deactivate, but not activate, the one or more antenna panels. In such examples, panel managing component 912 may send a panel deactivation request to the base station 102, and the base station 102 may reject, accept, or modify deactivation indicated in the request. In addition, in such examples, the base station 102 may directly instruct UE 104 to deactivate any panel, and panel managing component 912 may accordingly deactivate the panel. In addition, in some examples, base station 102 may instruct the UE 104 to activate, but not deactivate, the one or more antenna panels. In such examples, panel managing component 912 may send a panel activation request to the base station 102, and the base station 102 may reject, accept, or modify activation indicated in the request. In addition, in such examples, the base station 102 may directly instruct UE 104 to activate any panel, and panel managing component 912 may accordingly activate the panel.

In yet another example, panel managing component 912 may determine to handle activation and deactivation of antenna panels or may depend on the base station 102 to instruct both activation and deactivation (for example, in a single instruction or request).

In method 400, at block 404, the UE 104 may transmit, to a base station, an indication of activating or deactivating the at least one of a plurality of antenna panels. In an aspect, panel managing component 912, for example, in conjunction with one or more of communicating component 198, the TX processor 368, the RX processor 356, or the controller/processor 359, the memory 360, the receiver or transmitter 354, modem 802, radio 804, processor 806, memory 808, reception component 908, transmission component 910, or other components, may transmit, to the base station (for example, base station 102), the indication of activating or deactivating the at least one of the plurality of antenna panels. In an example, the indication may include an indicate that the UE is to (or will) activate or deactivate the at least one of the plurality of antenna panels. For example, the indication may include an indication of activation of an antenna panel, deactivation of an antenna panel, or both. The indication may also include a panel status of one or more antenna panels as activated, not activated (which may include a level of deactivation or deactivation state, for example, light or deep sleep and a corresponding action time for the panel), or the like The indication may also, in some examples, indicate an action time for the activation or deactivation, as descried further herein, after which the base station may assume the corresponding activation or deactivation is in effect at the UE 104. In some examples, panel managing component 912 may transmit the indication as panel status information in an event triggered report. Panel managing component 912 may detect the event trigger for the report, such as when an antenna panel status is changed at the UE 104, when the UE determines to activate or deactivate an antenna panel (for example, at block 402), or the like. In some examples, panel managing component 912 may transmit the indication in uplink control information (UCI) in PUCCH/PUSCH, in MAC-CE carrier in a known uplink grant or a new uplink grant requested by the UE via scheduling request (SR), or the like In method 400, at block 406, the UE 104 may activate or deactivate, based on transmitting the indication, the at least one of the plurality of antenna panels. In an aspect, panel managing component 912, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may activate or deactivate, based on transmitting the indication, the at least one of the plurality of antenna panels. In one example, panel managing component 912 may activate or deactivate the at least one of the plurality of antenna panels according to the action time, as described further herein. For example, panel managing component 912 may activate an antenna panel by applying power to physical antenna resources corresponding to the antenna panel, or may deactivate an antenna panel by removing or decreasing power to physical antenna resources corresponding to the antenna panel. In another example, panel managing component 912 may activate or deactivate an antenna panel by modifying a locally stored panel status used to consider the antenna panel in communications with the base station 102. Moreover, in some examples, panel managing component 912 may determine to activate or deactivate an antenna panel based on a determined or indicated action time, as described further herein.

In this regard, in activating or deactivating the at least one of the plurality of antenna panels at block 406, optionally at block 408, the UE 104 may activate or deactivate the at least one of the plurality of antenna panels based on transmitting the indication and according to an action time at which the UE is to activate or deactivate the at least one of the plurality of antenna panels. As described in further detail herein, the action time may be known at the UE 104, indicated in a configuration to the UE 104, or the like. The action time may allow for processing time at the UE 104 or base station to take further actions related to activating or deactivation the antenna panel before the configuration of antenna panels is modified. For example, the action time may allow processing time for the base station to map beam indications to an activated panel or from a deactivated panel, or the like.

FIG. 5 is a flowchart illustrating an example of a method 500 for determining to instruct a UE to activate or deactivate antenna panels in accordance with some aspects of the present disclosure. The method 500 may be performed by a base station (such as the base station 102, the wireless communication device 800, or the wireless communication device 1000). In some examples, the method 500 may be performed by a portion of a base station 102, wireless communication device 800, or wireless communication device 1000, such as including the memory 360, the memory 808, the TX processor 368, the RX processor 356, the controller/processor 359, the processor 806, or other components described herein.

In block 502, the base station may determine to activate or deactivate at least one of a plurality of antenna panels at a UE. In some implementations, panel indicating component 1012, for example, in conjunction with the configuring component 199 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 1008, the transmission component 1010, or other components described herein) may determine to activate or deactivate at least one of the plurality of antenna panels at the UE (for example, UE 104). For example, panel indicating component 1012 may determine to instruct the UE 104 to activate or deactivate the at least one antenna panel based on various considerations, such as detecting an environmental condition at an antenna panel (for example, detecting MPE for an antenna panel), or the like In some examples, panel indicating component 1012 may determine to instruct the UE 104 to activate or deactivate the one or more antenna panels (for example, instead of the UE 104 autonomously determining to activate or deactivate the one or more antenna panels) based on detecting one or more parameters or conditions. For example, panel indicating component 1012 may determine to instruct the UE 104 to activate or deactivate the one or more antenna panels based on a total number of activated antenna panels following activation or deactivation (for example, with respect to a threshold or a difference between a current number of activated panels and a new number of activated panels after activation or deactivation), a panel status of one or more antenna panels, or the like In some examples, panel indicating component 1012 may determine to instruct the UE 104 to activate or deactivate the one or more antenna panels where the total number of activated antenna panels (for example, as a result of the activation or deactivation) remains at a same value or decreases in value, and panel indicating component 1012 may depend on the base station to instruct the UE 104 to activate or deactivate where the total number of activated antenna panels increases. In a specific example, where the total number of activated panels becomes larger, panel indicating component 1012 may transmit a panel status request to the UE 104, or an instruction or request to modify activation or deactivation of the one or more antenna panels, and the UE 104 may accordingly determine to reject, accept, or modify activation or deactivation indicated in the request. In another specific example, where the total number of activated panels becomes larger, panel indicating component 1012 may receive, from the UE 104, an indication of the new panel status.

In another specific example, where the total number of activated panels remains or decreases, panel indicating component 1012 may transmit, to the UE 104, an instruction or request to activate or deactivate antenna panels as long as a total number of activated panels remains the same or is less (for example, via receiving the panel status command from the base station, which may indicate which panel should be in which status, or the like). In another specific example, where the total number of activated panels remains at a same value or decreases in value, panel indicating component 1012 may receive, from the UE 104, a panel status request, or an instruction or request to modify activation or deactivation of the one or more antenna panels, which may be accepted, rejected, or modified by the panel indicating component 1012 in indicating panel(s) to be activate or deactivated.

In some examples, panel indicating component 1012 may determine to instruct the UE 104 to activate or deactivate the one or more antenna panels where the total number of activated antenna panels (for example, as a result of the activation or deactivation) increases, and may depend on the base station to instruct activation or deactivation where the total number of activated antenna panels remains at a same value or decreases in value, as described above in reference to block 402 of method 400 in FIG. 4.

In another example, the UE 104 may activate, but not deactivate, the one or more antenna panels, and may depend on the base station 102 to instruct the UE 104 to deactivate antenna panels. In such examples, the UE 104 may activate antenna panels and may directly inform the base station 102 that at least one panel has been turned on. In addition, in such examples, where the panel indicating component 1012 sends a panel activation request, the UE 104 may reject, accept, or modify activation indicated in the request. In another example, the UE 104 may determine to deactivate, but not activate, the one or more antenna panels, and may depend on the base station 102 to instruct the UE 104 to activate antenna panels. In such examples, the UE 104 may deactivate antenna panels and may directly inform the base station 102 that at least one panel has been turned off. In addition, in such examples, where the panel indicating component 1012 sends a panel deactivation request, the UE 104 may reject, accept, or modify deactivation indicated in the request.

In addition, in some examples, panel managing component 912 may determine to deactivate one or more antenna panels based on determining that none of the panels are to be activated. In other words, for example, panel indicating component 1012 may instruct the UE 104 to deactivate, but not activate, the one or more antenna panels. In such examples, the UE 104 may send a panel deactivation request to the base station 102, and the panel indicating component 1012 may reject, accept, or modify deactivation indicated in the request in instructing the UE 104 to activate or deactivate the one or more antenna panels. In addition, in such examples, panel indicating component 1012 may directly instruct UE 104 to deactivate any panel, and the UE 104 may accordingly deactivate the panel.

In addition, in some examples, panel managing component 912 may determine to activate one or more antenna panels based on determining that none of the panels are to be deactivated. In other words, for example, panel indicating component 1012 may instruct the UE 104 to activate, but not deactivate, the one or more antenna panels. In such examples, the UE 104 may send a panel activation request to the base station 102, and the panel indicating component 1012 may reject, accept, or modify activation indicated in the request in instructing the UE 104 to activate or deactivate the one or more panels. In addition, in such examples, panel indicating component 1012 may directly instruct UE 104 to activate any panel, and the UE 104 may accordingly activate the panel.

In yet another example, panel indicating component 1012 may determine to instruct the UE 104 to both activate and deactivate antenna panels (for example, in a single instruction or request) or may depend on the UE 104 determine activation and deactivation in such cases.

In block 504, the base station 102 may transmit, to the UE, an indication to activate or deactivate the at least one of the plurality of antenna panels. In some implementations, panel indicating component 1012, for example, in conjunction with the configuring component 199 (which may include or operate in conjunction with one or more of the TX processor 368, the RX processor 356, the controller/processor 359, the memory 360, the receiver or transmitter 354, the modem 802, the radio 804, the processor 806, the memory 808, the reception component 1008, the transmission component 1010, or other components described herein) may transmit, to the UE (for example, UE 104), the indication to activate or deactivate the at least one of the plurality of antenna panels. For example, panel indicating component 1012 may transmit the indication in RRC signaling, MAC-CE or DCI in dynamic signaling, or the like In addition, for example, configuring component 199 may determine activated antenna panels at the UE 104, based on the determined activation or deactivation, and may use the determined activated antenna panels in allocating resources for communications between the UE 104 and base station 102. In some examples, configuring component 199 may associate activated antenna panels with beams to use in communications between the UE 104 and base station 102.

Figure 6:
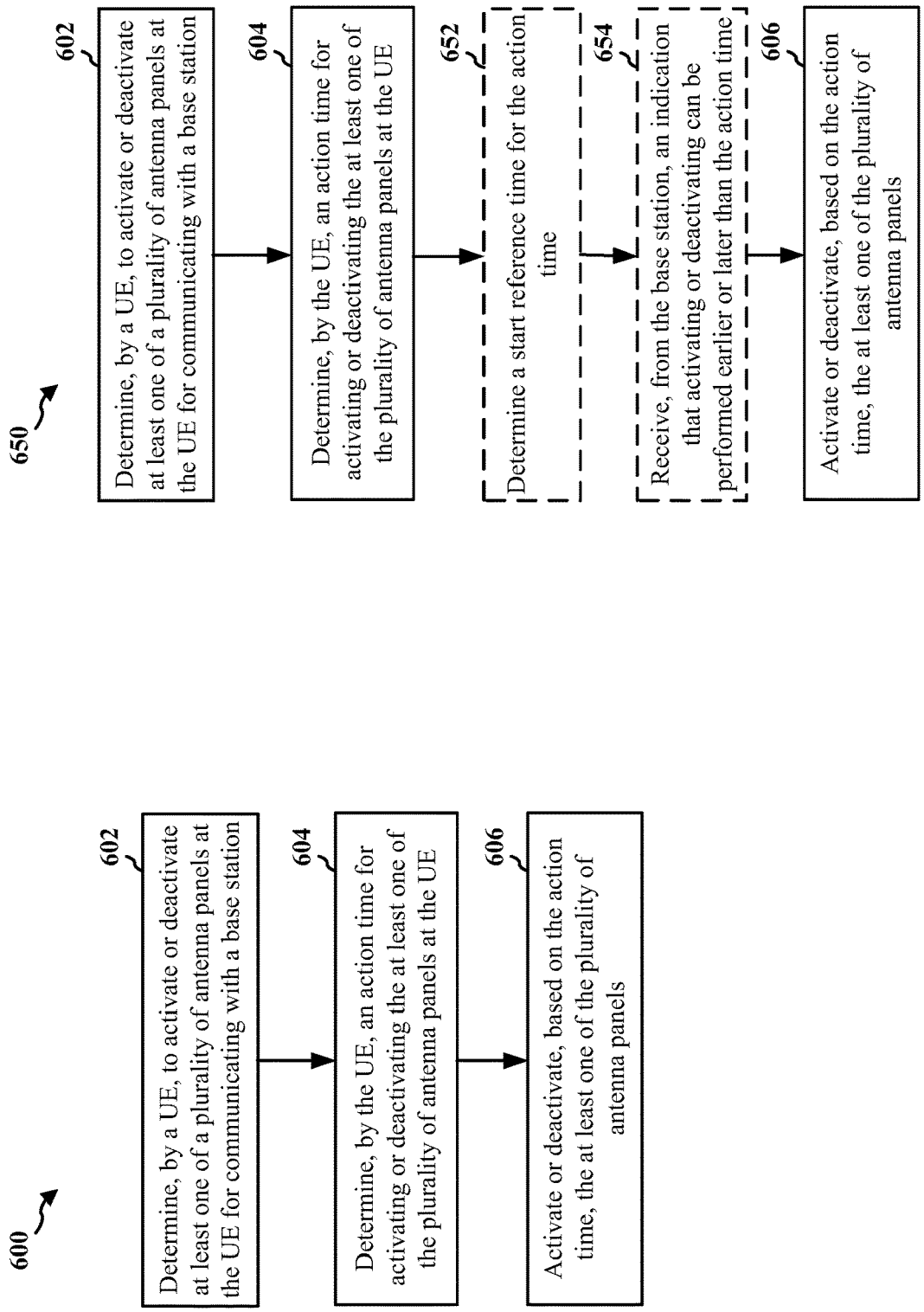
FIG. 6 illustrates flowcharts of examples of methods for activating or deactivating antenna panel(s) based on an action time in accordance with some aspects of the present disclosure.

FIG. 6 illustrates flowcharts of example methods 600 and 650 for activating or deactivating antenna panel(s) based on an action time in accordance with some aspects of the present disclosure. The methods 600 or 650 may be performed by a UE (such as the UE 104, the wireless communication device 800, the wireless communication device 900). In some examples, the methods 600 or 650 may be performed by a portion of a UE 104, wireless communication device 800, or wireless communication device 900, such as by the memory 360, memory 808, the TX processor 368, the RX processor 356, or the controller/processor 359, processor 806, or other components.

In method 600, at block 602, the UE may determine to activate or deactivate at least one of a plurality of antenna panels at the UE for communicating with a base station. In some aspects, panel managing component 912, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may determine to activate or deactivate the at least one of the plurality of antenna panels at the UE for communication with a base station (for example, base station 102). For example, panel managing component 912 may determine to activate or deactivate the at least one antenna panel based on one or more of the considerations or parameters described above (for example, in block 402 of method 400 in FIG. 4).

In method 600, at block 604, the UE may determine an action time for activating or deactivating the at least one of the plurality of antenna panels at the UE. In some aspects, time determining component 914, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may determine the action time for activating or deactivating the at least one of the plurality of antenna panels at the UE. For example, time determining component 914 may determine the action time to allow for activating an idle antenna panel, to allow for beam indication for a panel to be activated, or the like For example, if a panel deactivation decision/request is made/approved by the UE 104, the base station 102 may use additional time to map the beam indication(s) associated to a panel to be deactivated to other panel(s), and time determining component 914 may determine an action time at which to deactivate the panel based on this consideration. In another example, if a panel activation decision/request is made/approved by base station, the UE 104 may use additional time to activate the panel, and time determining component 914 may determine an action time at which to activate the panel based on this consideration.

In some examples, the action time may be the same or different for activation and deactivation. In this example, time determining component 914 may determine the action time based on whether panels are being activated or deactivated. In addition, in some examples, time determining component 914 may determine the action time as a value indicated for a wireless communication technology, such as 5G NR, which may be stored in a memory of the UE 104. In another example, time determining component 914 may determine the action time as, or based on, a UE capability, which communicating component 198 may indicate to the base station 102 in UE capability signaling (for example, via RRC). In yet another example, time determining component 914 may determine the action time in a configuration from the base station 102, which may be received in an RRC configuration, which may be based on UE capability (which, for example, may not be less than that indicated in the UE capability) or otherwise. In another example, the configuration from the base station 102 may be dynamically signalled (for example, in a panel activation or deactivation decision, request, or approval in separate messages), which may be in MAC-CE/DCI. In other examples, time determining component 914 may similarly configure the action time to the base station 102 in dynamic signaling (for example, in a panel activation or deactivation decision, request, or approval in separate messages), which may be in MAC-CE/UCI.

In addition, for example, time determining component 914 may determine the action time based on a configuration scenario. For example, where the node that determines to activate or deactivate the panel and the node that maps panels to beams for the UE are different (for example, one node is UE 104 and the other is base station 102), time determining component 914 may determine the action time based on a value determined from the wireless communication technology, the indicated UE capability, or the RRC signaling. Otherwise, time determining component 914 may determine the action time as zero. In another example, where the base station 102 both instructs the UE 104 to activate or deactivate the panel and maps panels to beams for the UE, time determining component 914 may determine a panel deaction time to be zero as the UE 104 may immediately deactivate the panel.

In method 600, at block 606, the UE may activate or deactivate, based on the action time, the at least one of the plurality of antenna panels. In some aspects, panel managing component 912, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may activate or deactivate, based on the action time, the at least one of the plurality of antenna panels. For example, panel managing component 912 may wait until the action time to perform activation or deactivation of the at least one of multiple antenna panels.

Method 650 may include blocks 602, 604, and 606 described in method 600, and may include one or more additional optional blocks described below. In method 650, optionally at block 652, the UE 104 may determine a start reference time for the action time. In some aspects, time determining component 914, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may determine the start reference time for the action time. Panel managing component 912 may activate or deactivate the at least one of multiple antenna panels at the action time as determined from the start reference time.

For example, time determining component 914 may determine the start reference time based on whether the UE 104 determines to activate or deactivate the panel(s) or whether the base station 102 instructs the UE 104 to activate or deactivate the panel(s). For example, where the UE 104 determines to activate or deactivate the panel(s) (for example, autonomously or otherwise indicates to the base station 102 that the panel(s) are activate or deactivated), time determining component 914 may determine the start reference time from the end of the UL transmission carrying the decision or from the end of the corresponding feedback (for example, ACK) received in a downlink transmission. In another example, where the base station 102 instructs the UE 104 to activate or deactivate the panels, time determining component 914 may determine the start reference time from the end of the DL transmission carrying the instruction or from the end of the corresponding feedback (for example, ACK) transmitted in an uplink transmission.

In another example, where the UE 104 requests to activate or deactivate the panel(s) and the base station 102 determines panel activation or deactivation based on the request, time determining component 914 may determine the start reference time from the end of the UL transmission carrying the request, and becoming valid when an approval or instruction for panel activation or deactivation is received from the base station 102, or from the end of the DL transmission carrying the approval or instruction based on the request, or from the end of the corresponding feedback (for example, ACK) sent in an uplink transmission. In another example, where the base station 102 requests to activate or deactivate the panel(s) and the UE 104 determines panel activation or deactivation based on the request, time determining component 914 may determine the start reference time from the end of the DL transmission carrying the request, and becoming valid when the UE determines to activate or deactivate the panel or when transmitting a panel status to the base station 102, or from the end of the UL transmission carrying the panel status based on the request, or from the end of the corresponding feedback (for example, ACK) received in a downlink transmission.

In method 650, optionally at block 654, the UE 104 may receive, from the base station, an indication that activating or deactivating may be performed earlier or later than the action time. In some aspects, time determining component 914, for example, in conjunction with communicating component 198, one or more of the TX processor 368, the RX processor 356, or the controller/processor 359, the memory 360, the receiver or transmitter 354, modem 802, radio 804, processor 806, memory 808, reception component 908, transmission component 910, or other components, may receive, from the base station, an indication that activating or deactivating may be performed earlier or later than the action time. For example, the base station 102 may dynamically inform the UE 104 that the panel activation or deactivation may be performed earlier than the action time, and time determining component 914 may receive an associated indication from the base station 102. For example, after UE 104 decides to deactivate a panel and notifies the base station 102, the base station 102 may finish mapping the beam indication(s) associated with the panel to be deactivated to other panel(s) before the action time, in which case base station 102 may indicate UE to deactivate the panel earlier than the action time for one or more purposes, such as to save power. The indication may be explicit or implicit (for example, UE may deactivate the panel when no beam indication is associated with the panel to be deactivated).

In another example, the base station 102 may dynamically inform UE that the panel activation or deactivation may be performed later than the action time, and time determining component 914 may receive an associated indication from the base station 102. For example, after UE 104 decides to deactivate a panel and notifies the base station 102, base station 102 may not be able to finish measurements before the action time to identify new panel(s) for mapping to the beam indication(s) associated with the panel to be deactivated. In this case, base station 102 may indicate UE that more time is desired (for example, extra X ms after the action time), and time determining component 914 may accordingly extend the time for performing activation or deactivation of the antenna panel(s). In another example, time determining component 914 may similarly inform the base station 102 of updated action times based on UE performing mapping before or after the action time.

Figure 7:
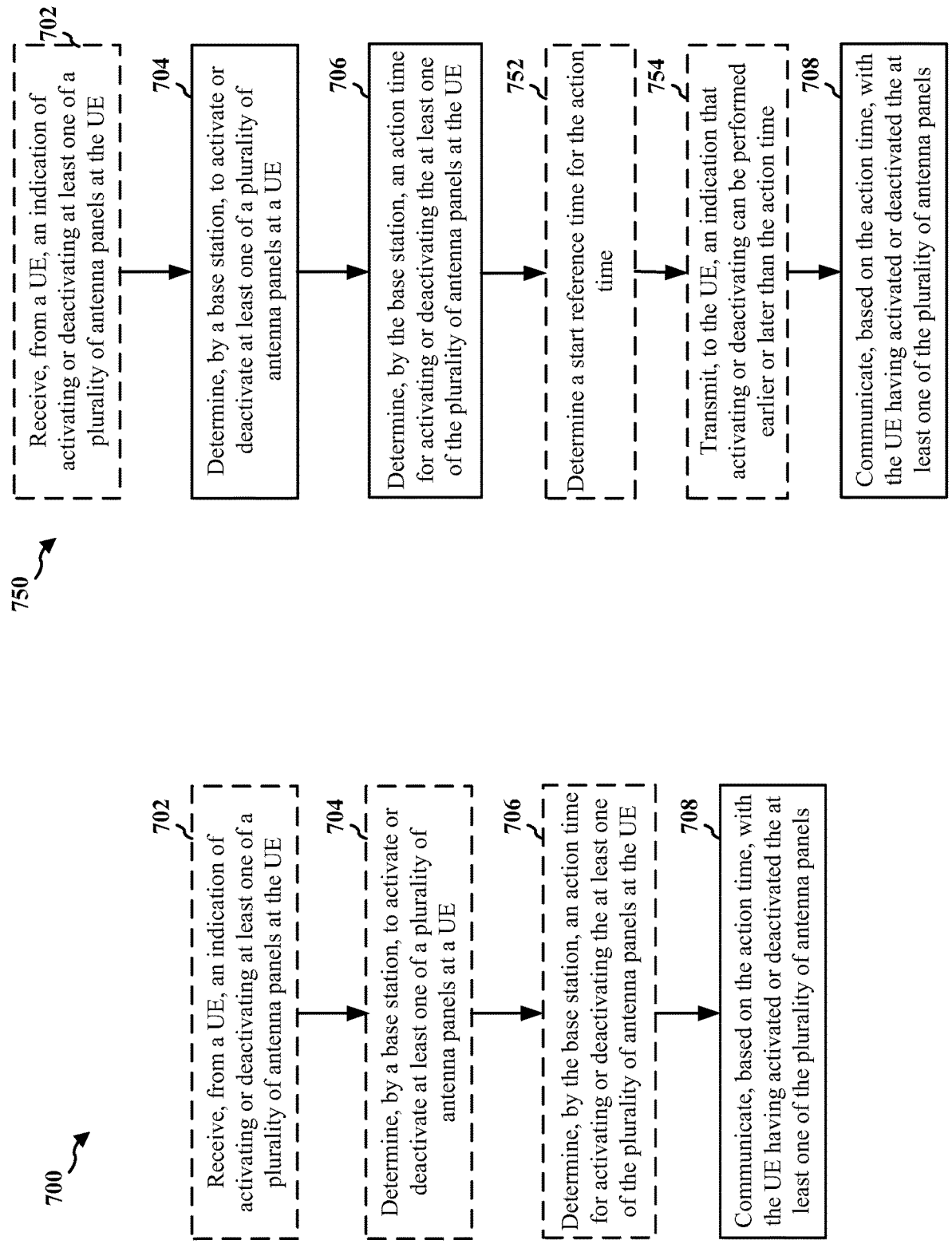
FIG. 7 illustrates flowcharts of examples of methods for communicating based on activated or deactivated antenna panel(s) based on an action time in accordance with some aspects of the present disclosure.

FIG. 7 illustrates flowcharts of example methods 700 and 750 for communicating based on activated or deactivated antenna panel(s) based on an action time in accordance with some aspects of the present disclosure. The methods 700 or 750 may be performed by a base station (such as the base station 102, the wireless communication device 800, the wireless communication device 1000). In some examples, the methods 700 or 750 may be performed by a portion of a base station 102, wireless communication device 800, or wireless communication device 1000, such as by the memory 360, memory 808, the TX processor 368, the RX processor 356, or the controller/processor 359, processor 806, or other components.

In method 700, optionally at block 702, the base station may receive, from a UE, an indication of activating or deactivating at least one of a plurality of antenna panels at the UE. In some aspects, panel indicating component 1012, for example, in conjunction with configuring component 199, one or more of the TX processor 368, the RX processor 356, or the controller/processor 359, the memory 360, the receiver or transmitter 354, modem 802, radio 804, processor 806, memory 808, reception component 1008, transmission component 1010, or other components, may receive, from the UE (for example, UE 104), the indication of activating or deactivating at least one of the plurality of antenna panels at the UE. In an example, the indication may include an indicate that the UE is to (or will) activate or deactivate the at least one of the plurality of antenna panels. For example, panel indicating component 1012 may receive the indication from the UE 104 in UCI or other control signaling, UE capability information, or the like.

In method 700, optionally at block 704, the base station may determine to activate or deactivate at least one of a plurality of antenna panels at the UE. In some aspects, panel indicating component 1012, for example, in conjunction with configuring component 199, one or more of the TX processor 368, the RX processor 356, or the controller/processor 359, the memory 360, the receiver or transmitter 354, modem 802, radio 804, processor 806, memory 808, reception component 1008, transmission component 1010, or other components, may determine to activate or deactivate the at least one of the plurality of antenna panels at the UE (for example, UE 104). For example, panel indicating component 912 may determine to activate or deactivate the at least one antenna panel (for example, by requesting or instructing the UE 104 to activate or deactivate the panel(s) based on one or more of the considerations or parameters described above (for example, in block 502 of method 500 in FIG. 5). In one example, panel indicating component 1012 may determine to activate or deactivate the at least one of the plurality of antenna panels based on the indication received from the UE (for example, at block 702).

In method 700, optionally at block 706, the base station may determine an action time for activating or deactivating the at least one of the plurality of antenna panels at the UE. In some aspects, time determining component 1014, for example, in conjunction with configuring component 199, one or more of the TX processor 368, the RX processor 356, or the controller/processor 359, the memory 360, the receiver or transmitter 354, modem 802, radio 804, processor 806, memory 808, reception component 1008, transmission component 1010, or other components, may determine the action time for activating or deactivating the at least one of the plurality of antenna panels at the UE. For example, time determining component 1014 may determine the action time to allow for the UE to activate an idle antenna panel, to allow for beam indication for a panel to be activated, or the like For example, if a panel deactivation decision/request is made/approved by the UE 104, panel indicating component 1014 use additional time to map the beam indication(s) associated to a panel to be deactivated to other panel(s), and time determining component 1014 may determine an action time at which to deactivate the panel based on this consideration. In another example, if a panel activation decision/request is made/approved by panel indicating component 1012, the UE 104 may use additional time to activate the panel, and time determining component 1014 may determine an action time at which to activate the panel based on this consideration.

In some examples, the action time may be the same or different for activation and deactivation. In this example, time determining component 1014 may determine the action time based on whether panels are being activated or deactivated. In addition, in some examples, time determining component 1014 may determine the action time as a value indicated for a wireless communication technology, such as 5G NR, which may be stored in a memory of the UE 104. In another example, time determining component 1014 may determine the action time as a UE capability, which configuring component 199 may receive from the UE 104 in UE capability signaling (for example, via RRC). In yet another example, time determining component 1014 may determine the action time as indicated in a configuration from the configuring component 199, which may be based on UE capability (which, for example, may not be less than that indicated in the UE capability) or otherwise. In another example, configuring component 199 may dynamically signal a configuration indicating the action time (for example, in a panel activation or deactivation decision, request, or approval in separate messages), which may be in MAC-CE/DCI. In other examples, the UE 104 may similarly configure the action time to the base station 102 in dynamic signaling (for example, in a panel activation or deactivation decision, request, or approval in separate messages), which may be in MAC-CE/UCI, and may be received or determined by the configuring component 199 or time determining component 1014.

In addition, for example, time determining component 1014 may determine the action time based on a configuration scenario. For example, where the node that determines to activate or deactivate the panel and the node that maps panels to beams for the UE are different (for example, one node is UE 104 and the other is base station 102), time determining component 1014 may determine the action time based on a value determined from the wireless communication technology, the indicated UE capability, or the RRC signaling. Otherwise, time determining component 1014 may determine the action time as zero. In another example, where the panel indicating component 1012 both instructs the UE 104 to activate or deactivate the panel and maps panels to beams for the UE, time determining component 1014 may determine a panel deaction time to be zero as the UE 104 may immediately deactivate the panel.

In method 700, at block 708, the base station may communicate, based on the action time, with the UE having activated or deactivated the at least one of the plurality of antenna panels. In some aspects, configuring component 199, for example, in conjunction with one or more of the TX processor 368, the RX processor 356, or the controller/processor 359, the memory 360, the receiver or transmitter 354, modem 802, radio 804, processor 806, memory 808, reception component 1008, transmission component 1010, or other components, may communicate, based on (or according to) the action time, with the UE having activated or deactivated the at least one of the plurality of antenna panels. For example, configuring component 199 may configure uplink or downlink communications with the UE 104 based on the set of activated antenna panels following activation or deactivation, as described.

Method 750 may include blocks 702, 704, 706, and 708 described in method 700, and may include one or more additional optional blocks described below. In method 750, optionally at block 752, the base station 102 may determine a start reference time for the action time. In some aspects, time determining component 1014, for example, in conjunction with configuring component 199, one or more of the TX processor 368, the RX processor 356, or the controller/processor 359, the memory 360, the receiver or transmitter 354, modem 802, radio 804, processor 806, memory 808, reception component 1008, transmission component 1010, or other components, may determine the start reference time for the action time. Panel indicating component 1012 may determine activation or deactivation of the at least one of multiple antenna panels at the action time as determined from the start reference time.

For example, time determining component 1014 may determine the start reference time based on whether the UE 104 determines to activate or deactivate the panel(s) or whether the panel indicating component 1012 instructs the UE 104 to activate or deactivate the panel(s). For example, where the UE 104 determines to activate or deactivate the panel(s) (for example, autonomously or otherwise indicates to the base station 102 that the panel(s) are activate or deactivated), time determining component 1014 may determine the start reference time from the end of the UL transmission carrying the decision or from the end of the corresponding feedback (for example, ACK) transmitted in a downlink transmission. In another example, where the panel indicating component 1012 instructs the UE 104 to activate or deactivate the panels, time determining component 1014 may determine the start reference time from the end of the DL transmission carrying the instruction or from the end of the corresponding feedback (for example, ACK) received in an uplink transmission.

In another example, where the UE 104 requests to activate or deactivate the panel(s) and the panel indicating component 1012 determines panel activation or deactivation based on the request, time determining component 1014 may determine the start reference time from the end of the UL transmission carrying the request, and becoming valid when an approval or instruction for panel activation or deactivation is determined or transmitted by panel indicating component 1012, or from the end of the DL transmission carrying the approval or instruction based on the request, or from the end of the corresponding feedback (for example, ACK) received in an uplink transmission. In another example, where the panel indicating component 1012 requests to activate or deactivate the panel(s) and the UE 104 determines panel activation or deactivation based on the request, time determining component 1014 may determine the start reference time from the end of the DL transmission carrying the request, and becoming valid when the UE determines to activate or deactivate the panel or when receiving a panel status from the UE 104, or from the end of the UL transmission carrying the panel status based on the request, or from the end of the corresponding feedback (for example, ACK) transmitted to the UE 104 in a downlink transmission.

In method 750, optionally at block 754, the base station 102 may transmit, to the UE, an indication that activating or deactivating may be performed earlier or later than the action time. In some aspects, time determining component 1014, for example, in conjunction with configuring component 199, one or more of the TX processor 368, the RX processor 356, or the controller/processor 359, the memory 360, the receiver or transmitter 354, modem 802, radio 804, processor 806, memory 808, reception component 1008, transmission component 1010, or other components, may transmit, to the UE, an indication that activating or deactivating may be performed earlier or later than the action time.

In some examples, time determining component 1014 may dynamically inform the UE 104 that the panel activation or deactivation may be performed earlier than the action time. For example, after UE 104 decides to deactivate a panel and notifies the base station 102, the panel indicating component 1012 may finish mapping the beam indication(s) associated with the panel to be deactivated to other panel(s) before the action time, in which case time determining component 1014 may indicate UE to deactivate the panel earlier than the action time to save power. The indication may be explicit or implicit (for example, UE may deactivate the panel when no beam indication is associated with the panel to be deactivated), and time determining component 1014 may accordingly determine the early action time used by the UE 104.

In another example, time determining component 1014 may dynamically inform UE that the panel activation or deactivation may be performed later than the action time. For example, after UE 104 decides to deactivate a panel and notifies the base station 102, panel indicating component 1012 may not be able to finish measurements before the action time to identify new panel(s) for mapping to the beam indication(s) associated with the panel to be deactivated. In this case, time determining component 1014 may indicate UE that more time is desired (for example, extra X ms after the action time), and may accordingly determine to extend the action time for performing activation or deactivation of the antenna panel(s) at the UE 104. In another example, time determining component 1014 may similarly receive, from the UE 104, updated action times based on UE performing mapping before or after the action time.

Figure 8:
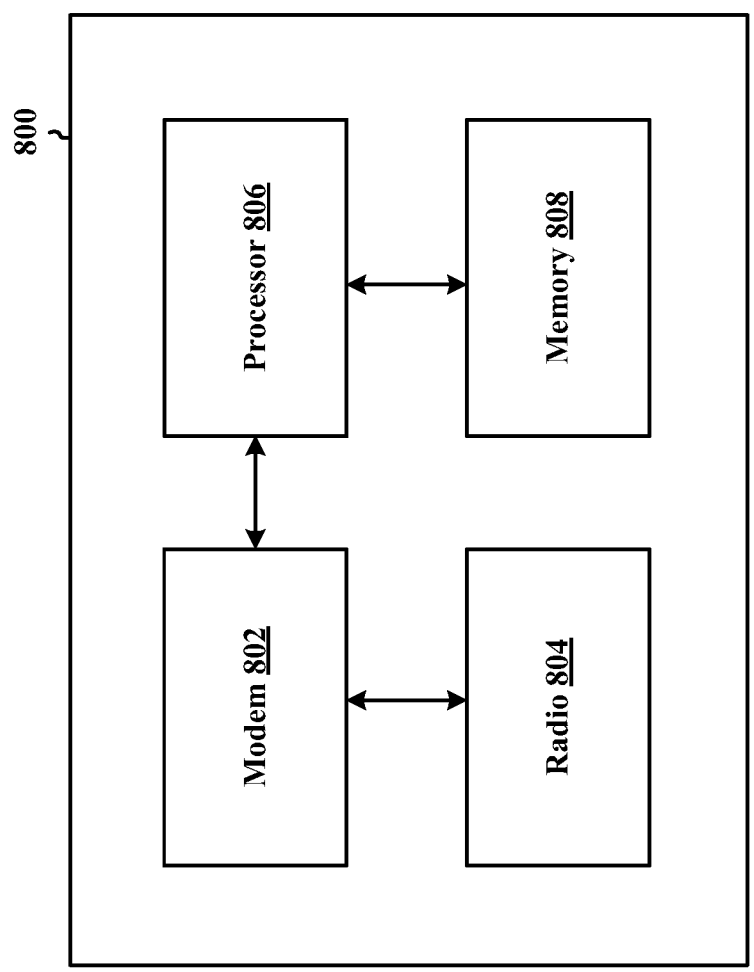
FIG. 8 shows a block diagram of an example of a wireless communication device that supports activating or deactivating antenna panels in accordance with some aspects of the present disclosure.

FIG. 8 shows a block diagram of an example of a wireless communication device 800 that supports activating or deactivating antenna panels in accordance with some aspects of the present disclosure. In some implementations, the wireless communication device 800 may be an example of a device for use in a UE such as one of the UEs 104 described with reference to FIG. 1. In some implementations, the wireless communication device 800 may be an example of a device for use in an base station such as the base station 102 described with reference to FIG. 1. The wireless communication device 800 is capable of transmitting (or outputting for transmission) and receiving wireless communications (for example, in the form of wireless packets). For example, the wireless communication device may be configured to transmit and receive packets in the form of PDCP PDUs and MAC PDUs, or the like.

The wireless communication device 800 may be, or may include, a chip, system on chip (SoC), chipset, package or device that includes one or more modems 802, (collectively "the modem 802"), which may include a WWAN modem (for example, a 3GPP 4G LTE or 5G compliant modem). In some implementations, the wireless communication device 800 also includes one or more radios 804 (collectively "the radio 804"). In some implementations, the wireless communication device 800 further includes one or more processors, processing blocks or processing elements 806 (collectively "the processor 806") and one or more memory blocks or elements 808 (collectively "the memory 808").

The modem 802 may include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number NSS of spatial streams or a number NSTS of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The de-multiplexed bits may then be descrambled and provided to the MAC layer (the processor 806) for processing, evaluation or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 may include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 may include an intelligent hardware block or device such as, for example, a processing core, a processing block, a central processing unit (CPU), a microprocessor, a micro-controller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of PDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 may include tangible storage media such as random-access memory (RAM) or read-only memory (ROM), or combinations thereof. The memory 808 also may store non-transitory processor- or computer-executable software (SW) code containing instructions that, when executed by the processor 806, cause the processor to perform various operations described herein for wireless communication, including the generation, transmission, reception and interpretation of PDUs, frames or packets. For example, various functions of components disclosed herein, or various blocks or steps of a method, operation, process or algorithm disclosed herein, may be implemented as one or more modules of one or more computer programs.

Figure 9:
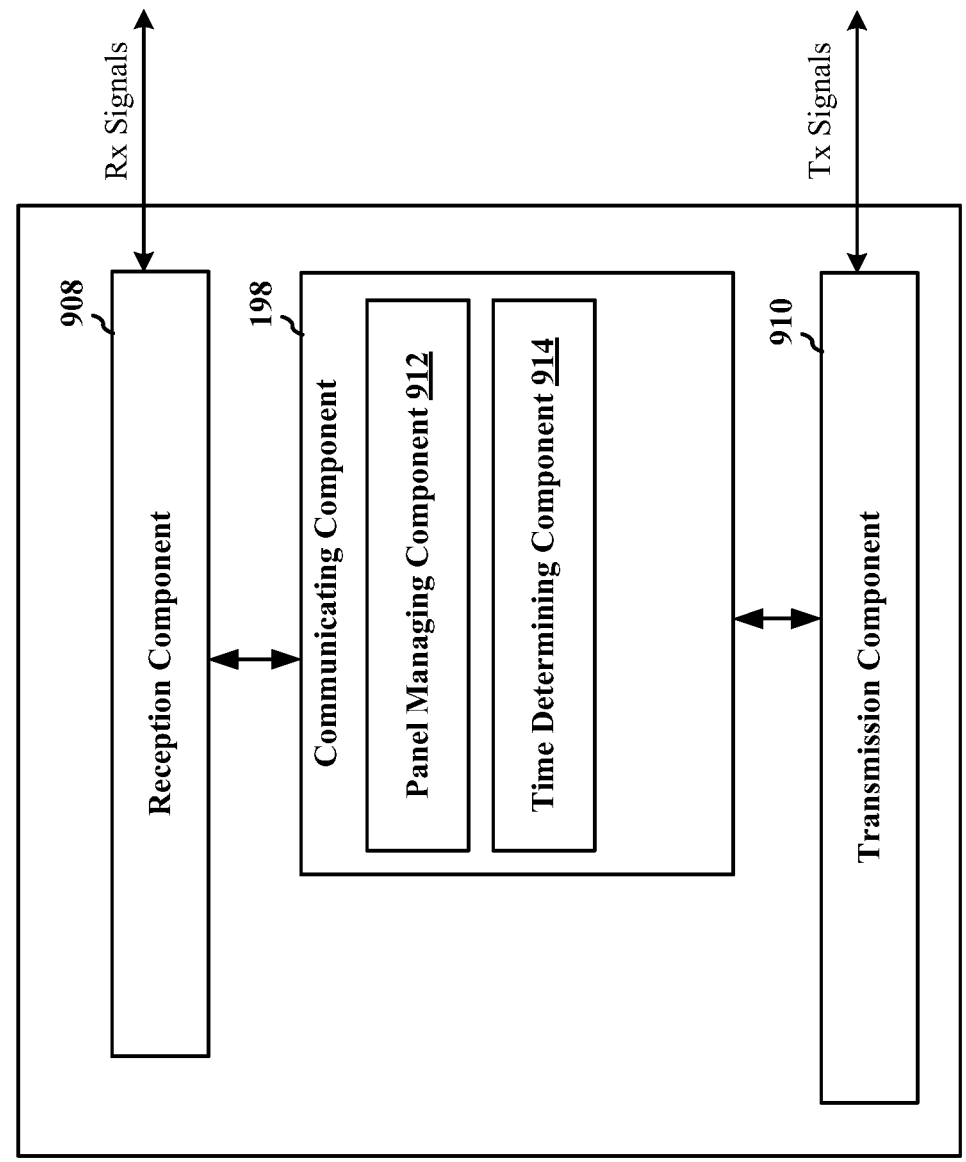
FIG. 9 shows a block diagram of an example of a wireless communication device according to some implementations that supports activating or deactivating antenna panels in accordance with some aspects of the present disclosure.

FIG. 9 shows a block diagram of an example of a wireless communication device 900 that supports activating or deactivating antenna panels in accordance with some aspects of the present disclosure. In some implementations, the wireless communication device 900 is configured to perform any of the processes 400 or 600 described above with reference to FIGS. 4 and 6, respectively. In some implementations, the wireless communication device 900 may be an example of an implementation of the wireless communication device 800 described above with reference to FIG. 8. For example, the wireless communication device 900 may be a chip, SoC, chipset, package or device that includes at least one processor and at least one modem (for example, a Wi-Fi (IEEE 802.11) modem or a cellular modem).

The wireless communication device 900 includes a reception component 908, a communicating component 198, and a transmission component 910. The communicating component 198 may further include a panel managing component 912, and a time determining component 914. Portions of one or more of the components 912 and 914, may be implemented at least in part in hardware or firmware. In some implementations, at least one of the components 912 and 914, is implemented at least in part as software stored in a memory (such as the memory 808). For example, portions of one or more of the components 912 and 914, may be implemented as non-transitory instructions or code executable by a processor (such as the processor 806) to perform the functions or operations of the respective component.

The reception component 908 is configured to receive RX signals from another wireless communication device. The communicating component 198 is configured to receive and measure downlink beams by one or more antenna panels via transmission component 910, as described herein. Moreover, as described, panel managing component 912 may activate or deactivate antenna panel(s) to use in communicating with a base station, time determining component 914 may determine an action time for activating or deactivating the antenna panel(s).

Figure 10:
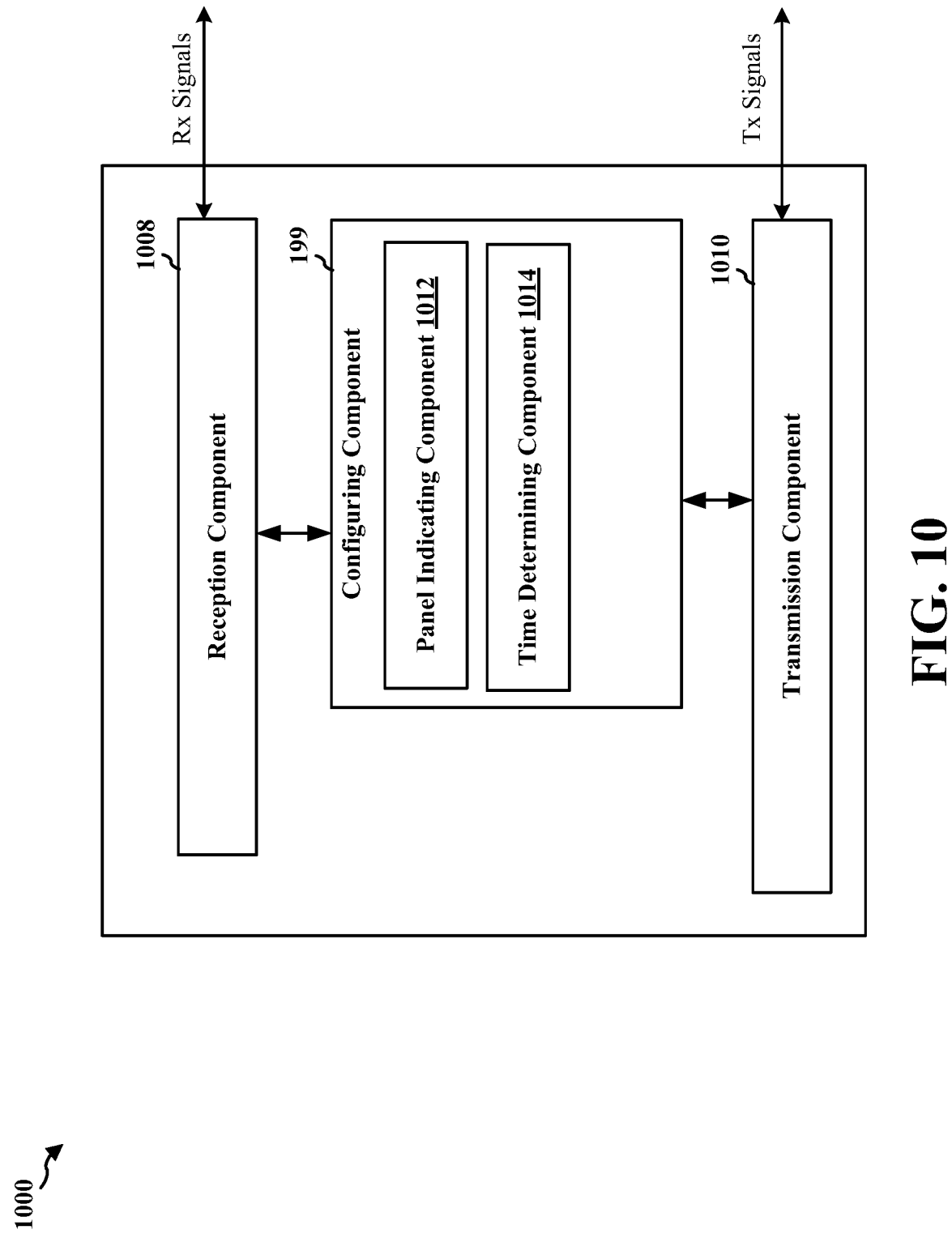
FIG. 10 shows a block diagram of an example of a wireless communication device according to some implementations that supports activating or deactivating antenna panels in accordance with some aspects of the present disclosure.

FIG. 10 shows a block diagram of an example of a wireless communication device 1000 that supports activating or deactivating antenna panels in accordance with some aspects of the present disclosure. In some implementations, the wireless communication device 1000 is configured to perform processes 500 and 700 described above with reference to FIGS. 5 and 7. In some implementations, the wireless communication device 1000 may be an example of an implementation of the wireless communication device 800 described above with reference to FIG. 8. For example, the wireless communication device 1000 may be a chip, SoC, chipset, package or device that includes at least one processor and at least one modem (for example, a Wi-Fi (IEEE 802.11) modem or a cellular modem).

The wireless communication device 1000 includes a reception component 1008, a configuring component 199, and a transmission component 1010. The configuring component 199 may further include a panel indicating component 1012, and a time determining component 1014. Portions of one or more of the components 1012 or 1014 may be implemented at least in part in hardware or firmware. In some implementations, at least one of the components 1012 or 1014 is implemented at least in part as software stored in a memory (such as the memory 808). For example, portions of one or more of the components 1012 or 1014 may be implemented as non-transitory instructions or code executable by a processor (such as the processor 806) to perform the functions or operations of the respective component.

The reception component 1008 is configured to receive RX signals from another wireless communication device. In some implementations, the RX signals may include uplink signals received from a UE 104. The configuring component 199 is configured to request, instruct, or determine activation or deactivation of antenna panel(s) at a UE, via panel indicating component 1012, or to determine an action time for activating or deactivating the antenna panel(s) at the UE via time determining component 1014.

The following aspects are illustrative only and aspects thereof may be combined with aspects of other embodiments or teaching described herein, without limitation.

Aspect 1 is a method for wireless communication including determining, by a UE, to activate or deactivate at least one of a plurality of antenna panels at the UE, transmitting, to a base station, an indication of activating or deactivating the at least one of the plurality of antenna panels; and activating or deactivating, based on transmitting the indication, the at least one of the plurality of antenna panels.

In Aspect 2, the method of Aspect 1 includes where the indication indicates, for the at least one of the plurality of antenna panels, a panel status of one of activated or deactivated, wherein a deactivated status includes a level of deactivation and corresponding action time.

In Aspect 3, the method of any of Aspects 1 or 2 includes where transmitting the indication includes transmitting the indication to the base station in uplink control information or in a MAC-CE.

In Aspect 4, the method of any of Aspects 1 to 3 includes where determining, by the UE, to activate or deactivate the at least one of the plurality of antenna panels is based on determining a number of activated antenna panels of the plurality of antenna panels.

In Aspect 5, the method of Aspect 4 includes where determining, by the UE, to activate or deactivate the at least one of the plurality of antenna panels is based on determining the number of activated antenna panels, after performing the activation or deactivation of the at least one of the plurality of antenna panels, results in the number of activated antenna panels as being at least a threshold.

In Aspect 6, the method of any of Aspects 4 or 5 includes where determining, by the UE, to activate or deactivate the at least one of the plurality of antenna panels is based on determining the number of activated antenna panels, after performing the activation or deactivation of the at least one of the plurality of antenna panels, results in the number of activated antenna panels as being below a threshold.

In Aspect 7, the method of any of Aspects 1 to 6 includes where determining, by the UE, to activate or deactivate the at least one of the plurality of antenna panels is based on none of the at least one of the plurality of antenna panels determined to be deactivated.

In Aspect 8, the method of any of Aspects 1 to 7 includes where determining, by the UE, to activate or deactivate the at least one of the plurality of antenna panels is based on none of the at least one of the plurality of antenna panels determined to be activated.

Aspect 9 is a method for wireless communication including determining, by a UE, to activate or deactivate at least one of a plurality of antenna panels at the UE for communicating with a base station, determining, by the UE, an action time for activating or deactivating the at least one of the plurality of antenna panels at the UE; and activating or deactivating, based on the action time, the at least one of the plurality of antenna panels.

In Aspect 10, the method of Aspect 9 includes transmitting, to the base station, an indication of activating or deactivating the at least one of the plurality of antenna panels.

In Aspect 11, the method of Aspect 10 includes where determining the action time is based on receiving, from the base station, an indication to activate or deactivate the at least one of the plurality of antenna panels.

In Aspect 12, the method of Aspect 11 includes where receiving the indication includes receiving the indication in RRC signaling, a MAC-CE, or downlink control information from the base station.

In Aspect 13, the method of any of Aspects 10 to 12 includes where determining the action time is based on a time for the base station to map a beam indication to the at least one of the plurality of antenna panels.

In Aspect 14, the method of any of Aspects 10 to 13 includes where activating or deactivating the at least one of the plurality of antenna panels at the action time includes determining the action time based on a start reference time.

In Aspect 15, the method of Aspect 14 includes determining the start reference time from an end of transmitting, to the base station, an indication of activating or deactivating the at least one of the plurality of antenna panels.

In Aspect 16, the method of any of Aspects 14 or 15 includes determining the start reference time from an end of transmitting, to the base station, an acknowledgement of receiving, from the base station, an indication to activate or deactivate the at least one of the plurality of antenna panels.

In Aspect 17, the method of any of Aspects 14 to 16 includes determining the start reference time from an end of transmitting, to the base station, a request to activate or deactivate the at least one of the plurality of antenna panels.

In Aspect 18, the method of Aspect 17 includes determining the start reference time as valid based on receiving, from the base station, an approval of the request.

In Aspect 19, the method of any of Aspects 14 to 18 includes determining the start reference time from an end of receiving, from the base station, an approval of a request to activate or deactivate the at least one of the plurality of antenna panels.

In Aspect 20, the method of any of Aspects 14 to 19 includes determining the start reference time from an end of transmitting, to the base station, an acknowledgement of receiving, from the base station, an approval of a request to activate or deactivate the at least one of the plurality of antenna panels.

In Aspect 21, the method of any of Aspects 10 to 20 includes where the action time is different for activating the at least one of the plurality of antenna panels than for deactivating the at least one of the plurality of antenna panels.

In Aspect 22, the method of any of Aspects 10 to 21 includes where determining the action time is based on a UE capability indicated to the base station.

In Aspect 23, the method of any of Aspects 10 to 22 includes receiving, from the base station, an indication that activating or deactivating the at least one antenna panel may be performed earlier than the action time, where activating or deactivating the at least one antenna panel is performed, based on the indication, earlier than the action time.

In Aspect 24, the method of Aspect 23 includes where the indication is an explicit indication or an implicit indication determined from a beam indication received from the base station.

In Aspect 25, the method of any of Aspects 10 to 24 includes receiving, from the base station, an indication that activating or deactivating the at least one antenna panel may be performed later than the action time, where activating or deactivating the at least one antenna panel is performed, based on the indication, later than the action time.

Aspect 26 is a method for wireless communication including determining, by a base station, to activate or deactivate at least one of a plurality of antenna panels at a UE, where the determining is based on at least one of determining a number of activated antenna panels of the plurality of antenna panels, determining none of the at least one of the plurality of antenna panels are determined to be deactivated, or determining none of the at least one of the plurality of antenna panels are determined to be activated, and transmitting, to the UE, an indication to activate or deactivate the at least one of the plurality of antenna panels.

In Aspect 27, the method of Aspect 26 includes where determining the number of activated antenna panels includes determining, after performing the activation or deactivation of the at least one of the plurality of antenna panels, the number of activated antenna panels as being at least a threshold.

In Aspect 28, the method of any of Aspects 26 or 27 includes where determining the number of activated antenna panels includes determining, after performing the activation or deactivation of the at least one of the plurality of antenna panels, the number of activated antenna panels as being below a threshold.

Aspect 29 is a method for wireless communication including determining, by a base station, to activate or deactivate at least one of a plurality of antenna panels at a UE, determining, by the base station, an action time for activating or deactivating the at least one of the plurality of antenna panels at the UE, and communicating, based on the action time, with the UE having activated or deactivated the at least one of the plurality of antenna panels.

In Aspect 30, the method of Aspect 29 includes transmitting, to the UE, an indication to activate or deactivate the at least one of the plurality of antenna panels.

In Aspect 31, the method of any of Aspects 29 or 30 includes where determining the action time is based on receiving, from the UE, an indication to activate or deactivate the at least one of the plurality of antenna panels.

In Aspect 32, the method of any of Aspects 29 to 31 includes where determining the action time is based on a time for the UE to map a beam indication to the at least one of the plurality of antenna panels.

In Aspect 33, the method of any of Aspects 29 to 32 includes where communicating with the UE having activated or deactivated the at least one of the plurality of antenna panels at the action time includes determining the action time based on a start reference time.

In Aspect 34, the method of Aspect 33 includes determining the start reference time from an end of transmitting, to the UE, an indication of activating or deactivating the at least one of the plurality of antenna panels.

In Aspect 35, the method of any of Aspects 33 or 34 includes determining the start reference time from an end of transmitting, to the UE, an acknowledgement of receiving, from the UE, an indication to activate or deactivate the at least one of the plurality of antenna panels.

In Aspect 36, the method of any of Aspects 33 to 35 includes determining the start reference time from an end of transmitting, to the UE, a request to activate or deactivate the at least one of the plurality of antenna panels.

In Aspect 37, the method of Aspect 36 includes determining the start reference time as valid based on receiving, from the UE, an approval of the request.

In Aspect 38, the method of any of Aspects 33 to 37 includes determining the start reference time from an end of receiving, from the UE, an approval of a request to activate or deactivate the at least one of the plurality of antenna panels.

In Aspect 39, the method of any of Aspects 33 to 38 includes determining the start reference time from an end of transmitting, to the UE, an acknowledgement of receiving, from the UE, an approval of a request to activate or deactivate the at least one of the plurality of antenna panels.

In Aspect 40, the method of any of Aspects 29 to 39 includes where the action time is different for activating the at least one of the plurality of antenna panels than for deactivating the at least one of the plurality of antenna panels.

In Aspect 41, the method of any of Aspects 29 to 40 includes where determining the action time is based on a UE capability indicated to the base station.

In Aspect 42, the method of any of Aspects 29 to 41 includes transmitting, to the UE, an indication of the action time in RRC signaling, a MAC-CE, or downlink control information.

In Aspect 43, the method of any of Aspects 29 to 42 includes transmitting, to the UE, an indication that activating or deactivating the at least one antenna panel may be performed earlier than the action time, where communicating with the UE having activated or deactivated the at least one of the plurality of antenna panels is based on the indication.

In Aspect 44, the method of Aspect 43 includes where the indication is an explicit indication or an implicit indication based on a beam indication transmitted to the UE.

In Aspect 45, the method of any of Aspects 29 to 44 includes transmitting, to the UE, an indication that activating or deactivating the at least one antenna panel may be performed later than the action time, where communicating with the UE having activated or deactivated the at least one of the plurality of antenna panels is based on the indication.

Aspect 46 is a method for wireless communication at a UE including transmitting, to a base station, an indication that the UE is to activate or deactivate at least one of a plurality of antenna panels, and activating or deactivating the at least one of the plurality of antenna panels according to an action time at which the apparatus is to activate or deactivate the at least one of the plurality of antenna panels.

In Aspect 47, the method of Aspect 46 includes where receiving, from the base station, the action time is in RRC signaling, a MAC-CE, or downlink control information.

In Aspect 48, the method of any of Aspects 46 or 47 includes where the action time is determined based on a capability to activate or deactivate the at least one of the plurality of antenna panels within a fixed duration of time after a start reference time.

In Aspect 49, the method of Aspect 48 includes where the start reference time is at an end of at least one of transmitting, to the base station, the indication, receiving, from the base station, an approval of the indication, or transmitting, to the base station, an acknowledgement of receiving, from the base station, the approval of the indication.

In Aspect 50, the method of Aspect 48 includes determining whether the start reference time is valid based on receiving, from the base station, the approval of the indication.

In Aspect 51, the method of any of Aspects 46 to 50 includes where the action time is based on a capability to map a beam indicated for the at least one of the plurality of antenna panels being activated or deactivated.

In Aspect 52, the method of any of Aspects 46 to 51 includes where the indication indicates, for the at least one of the plurality of antenna panels, an activated status or a deactivated status, where, based on the at least one of the plurality of antenna panels being in a deactivated status, the indication further includes a level of deactivation and the action time.

In Aspect 53, the method of any of Aspects 46 to 52 includes where transmitting the indication to the base station is in uplink control information or in a MAC-CE.

In Aspect 54, the method of any of Aspects 46 to 53 includes where activating or deactivating the at least one of the plurality of antenna panels is based on determining whether a number of activated antenna panels of the plurality of antenna panels, after performing the activation or deactivation of the at least one of the plurality of antenna panels, would be below a threshold or above the threshold, respectively.

In Aspect 55, the method of any of Aspects 46 to 54 includes where activating the at least one of the plurality of antenna panels is based on none of the at least one of the plurality of antenna panels being indicated, by the indication, as deactivated, or where deactivating the at least one of the plurality of antenna panels is based on none of the at least one of the plurality of antenna panels being indicated, by the indication, as activated.

In Aspect 56, the method of any of Aspects 46 to 55 includes where the action time is different for activating the at least one of the plurality of antenna panels than for deactivating the at least one of the plurality of antenna panels.

In Aspect 57, the method of any of Aspects 46 to 56 includes where the action time is based on a capability indicated to the base station.

In Aspect 58, the apparatus of method of any of Aspects 46 to 57 includes receiving, from the base station, a second indication that activating or deactivating the at least one of the plurality of antenna panels is permitted to be performed earlier than the action time, where activating or deactivating the at least one of the plurality of antenna panels, based on the second indication, is earlier than the action time.

In Aspect 59, the method of Aspect 58 includes where the second indication is an explicit indication or an implicit indication determined from a beam indication received from the base station.

In Aspect 60, the method of any of Aspects 46 to 59 includes receiving, from the base station, a second indication that activating or deactivating the at least one of the plurality of antenna panels may be performed later than the action time, where activating or deactivating the at least one antenna panel, based on the second indication, is later than the action time.

Aspect 61 is a method for wireless communication including receiving, from a UE, an indication that the UE is to activate or deactivate at least one of a plurality of antenna panels at the UE, and communicating, according to an action time at which the UE is to activate or deactivate the at least one of the plurality of antenna panels, with the UE having activated or deactivated the at least one of the plurality of antenna panels.

In Aspect 62, the method of Aspect 60 includes where the action time is determined within a fixed duration of time after a start reference time, wherein the start reference time is at an end of at least one of receiving, from the UE, the indication, transmitting, to the UE, an approval of the indication, or receiving, from the UE, an acknowledgement of receiving, from the base station, the approval of the indication Aspect 63 is an apparatus for wireless communication including a transceiver, a memory configured to store instructions, and one or more processors communicatively coupled with the transceiver and the memory, wherein the one or more processors are configured to execute the instructions to perform the operations of one or more methods in Aspects 1 to 62.

Aspect 64 is an apparatus for wireless communication including means for performing the operations of one or more methods in Aspects 1 to 62.

Aspect 65 is a computer-readable medium including code executable by one or more processors to perform the operations of one or more methods in Aspects 1 to 62.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may include A only, B only, C only, A and B only, A and C only, B and C only, or A and B and C, where any such combinations may contain one or more members of any of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
   a transceiver;
   a memory configured to store instructions; and
   one or more processors communicatively coupled with the transceiver and the memory, wherein the one or more processors are configured to:
      transmit, to a network node, according to an event triggered at the apparatus, an indication that the apparatus is to activate or deactivate at least one of a plurality of antenna panels, the event being associated with a change in panel status of the at least one of the plurality of antenna panels; and
      activate or deactivate the at least one of the plurality of antenna panels according to an action time at which the apparatus is to activate or deactivate the at least one of the plurality of antenna panels.

2. The apparatus of claim 1, wherein the one or more processors are further configured to receive, from the network node, the action time in radio resource control (RRC) signaling, a media access control (MAC)-control element (CE), or downlink control information.

3. The apparatus of claim 1, wherein the action time is associated with a capability to activate or deactivate the at least one of the plurality of antenna panels within a fixed duration of time after a start reference time.

4. The apparatus of claim 3, wherein the start reference time is at an end of at least one of:
   transmitting, to the network node, the indication;
   receiving, from the network node, an approval of the indication; or
   transmitting, to the network node, an acknowledgement of receiving, from the network node, the approval of the indication.

5. The apparatus of claim 4, wherein the one or more processors are further configured to determine whether the start reference time is valid based on receiving, from the network node, the approval of the indication.

6. The apparatus of claim 1, wherein the action time is associated with capability to map a beam indicated for the at least one of the plurality of antenna panels being activated or deactivated.

7. The apparatus of claim 1, wherein the action time is different for activating the at least one of the plurality of antenna panels than for deactivating the at least one of the plurality of antenna panels.

8. The apparatus of claim 1, wherein the indication indicates, for the at least one of the plurality of antenna panels, an activated status or a deactivated status, wherein, based on the at least one of the plurality of antenna panels being in a deactivated status, the indication further includes a level of deactivation and the action time.

9. The apparatus of claim 1, wherein the one or more processors are configured to transmit the indication to the network node in uplink control information or in a media access control (MAC)-control element (CE).

10. The apparatus of claim 1, wherein the one or more processors are configured to activate or deactivate the at least one of the plurality of antenna panels based on determining whether a number of activated antenna panels of the plurality of antenna panels, after performing the activation or deactivation of the at least one of the plurality of antenna panels, would be below a threshold or above the threshold, respectively.

11. The apparatus of claim 1,
wherein the one or more processors are configured to activate the at least one of the plurality of antenna panels based on none of the at least one of the plurality of antenna panels being indicated, by the indication, as deactivated, or
wherein the one or more processors are configured to deactivate the at least one of the plurality of antenna panels based on none of the at least one of the plurality of antenna panels being indicated, by the indication, as activated.

12. The apparatus of claim 1, wherein the one or more processors are further configured to receive, from the network node, a second indication that activating or deactivating the at least one of the plurality of antenna panels is permitted to be performed earlier than the action time, wherein the one or more processors are configured to activate or deactivate the at least one of the plurality of antenna panels, based on the second indication, earlier than the action time.

13. The apparatus of claim 12, wherein the second indication is an explicit indication or an implicit indication determined from a beam indication received from the network node.

14. The apparatus of claim 1, wherein the one or more processors are further configured to receive, from the network node, a second indication that activating or deactivating the at least one of the plurality of antenna panels is permitted to be performed later than the action time, wherein the one or more processors are configured to activate or deactivate the at least one of the plurality of antenna panels, based on the second indication, later than the action time.

15. The apparatus of claim 1, wherein the one or more processors are configured to activate or deactivate the at least one of the plurality of antenna panels without receiving a request or instruction from the network node.

16. A method for wireless communication at a user equipment (UE), comprising:

transmitting, to a network node, according to an event triggered at the UE, an indication that the UE is to activate or deactivate at least one of a plurality of antenna panels, the event being associated with a change in panel status of the at least one of the plurality of antenna panels; and
activating or deactivating the at least one of the plurality of antenna panels according to an action time at which the UE is to activate or deactivate the at least one of the plurality of antenna panels.

17. The method of claim 16, further comprising receiving, from the network node, the action time in radio resource control (RRC) signaling, a media access control (MAC)-control element (CE), or downlink control information.

18. The method of claim 16, wherein the action time is associated with a capability to activate or deactivate the at least one of the plurality of antenna panels within a fixed duration of time after a start reference time.

19. The method of claim 18, wherein the start reference time is at an end of at least one of:
transmitting, to the network node, the indication;
receiving, from the network node, an approval of the indication; or
transmitting, to the network node, an acknowledgement of receiving, from the network node, the approval of the indication.

20. The method of claim 19, further comprising determining whether the start reference time is valid based on receiving, from the network node, the approval of the indication.

21. The method of claim 16, wherein the action time is associated with a capability to map a beam indicated for the at least one of the plurality of antenna panels being activated or deactivated.

22. The method of claim 16, wherein the action time is different for activating the at least one of the plurality of antenna panels than for deactivating the at least one of the plurality of antenna panels.

23. The method of claim 16, wherein the indication indicates, for the at least one of the plurality of antenna panels, an activated status or a deactivated status, wherein, based on the at least one of the plurality of antenna panels being in a deactivated status, the indication further includes a level of deactivation and the action time.

24. The method of claim 16, wherein transmitting the indication includes transmitting the indication to the network node in uplink control information or in a media access control (MAC)-control element (CE).

25. The method of claim 16, wherein activating or deactivating the at least one of the plurality of antenna panels is based on determining whether a number of activated antenna panels of the plurality of antenna panels, after performing the activation or deactivation of the at least one of the plurality of antenna panels, would be below a threshold or above the threshold, respectively.

26. The method of claim 16,
wherein activating the at least one of the plurality of antenna panels is based on none of the at least one of the plurality of antenna panels being indicated, by the indication, as deactivated, or
wherein deactivating the at least one of the plurality of antenna panels is based on none of the at least one of the plurality of antenna panels being indicated, by the indication, as activated.

27. The method of claim 16, further comprising receiving, from the network node, a second indication that activating or deactivating the at least one of the plurality of antenna panels is permitted to be performed earlier than the action time, wherein activating or deactivating the at least one of the plurality of antenna panels, based on the second indication, is earlier than the action time.

28. An apparatus for wireless communication, comprising:
  a transceiver;
  a memory configured to store instructions; and
  one or more processors communicatively coupled with the transceiver and the memory, wherein the one or more processors are configured to:
    receive, from a user equipment (UE), according to an event triggered at the UE, an indication that the UE is to activate or deactivate at least one of a plurality of antenna panels at the UE, the event being associated with a change in panel status of the at least one of the plurality of antenna panels; and
    communicating, according to an action time at which the UE is to activate or deactivate the at least one of the plurality of antenna panels, with the UE having activated or deactivated the at least one of the plurality of antenna panels.

29. The apparatus of claim 28, wherein the action time is determined within a fixed duration of time after a start reference time, wherein the start reference time is at an end of at least one of:
  receiving, from the UE, the indication;
  transmitting, to the UE, an approval of the indication; or
  receiving, from the UE, an acknowledgement of receiving, from apparatus, the approval of the indication.

30. A method for wireless communication by a network node, comprising:
  receiving, from a user equipment (UE), according to an event triggered at the UE, an indication that the UE is to activate or deactivate at least one of a plurality of antenna panels at the UE, the event being associated with a change in panel status of the at least one of the plurality of antenna panels; and
  communicating, according to an action time at which the UE is to activate or deactivate the at least one of the plurality of antenna panels, with the UE having activated or deactivated the at least one of the plurality of antenna panels.

31. The method of claim 30, wherein the action time is determined within a fixed duration of time after a start reference time, wherein the start reference time is at an end of at least one of:
  receiving, from the UE, the indication;
  transmitting, to the UE, an approval of the indication; or
  receiving, from the UE, an acknowledgement of receiving, from the network node, the approval of the indication.

* * * * *